J. H. APP.
DRIVE MECHANISM.
APPLICATION FILED JULY 5, 1911.

1,029,736.

Patented June 18, 1912.
2 SHEETS—SHEET 1.

Witnesses
F. E. Ernst
Anna C. Raviler

Inventor
James H. App,

Attorneys

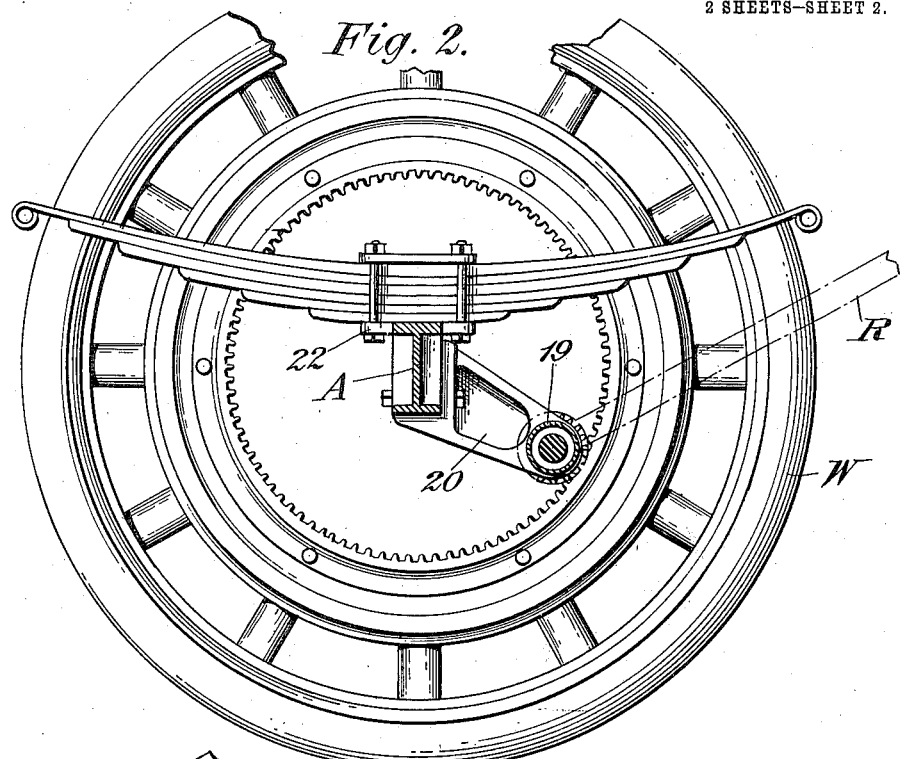
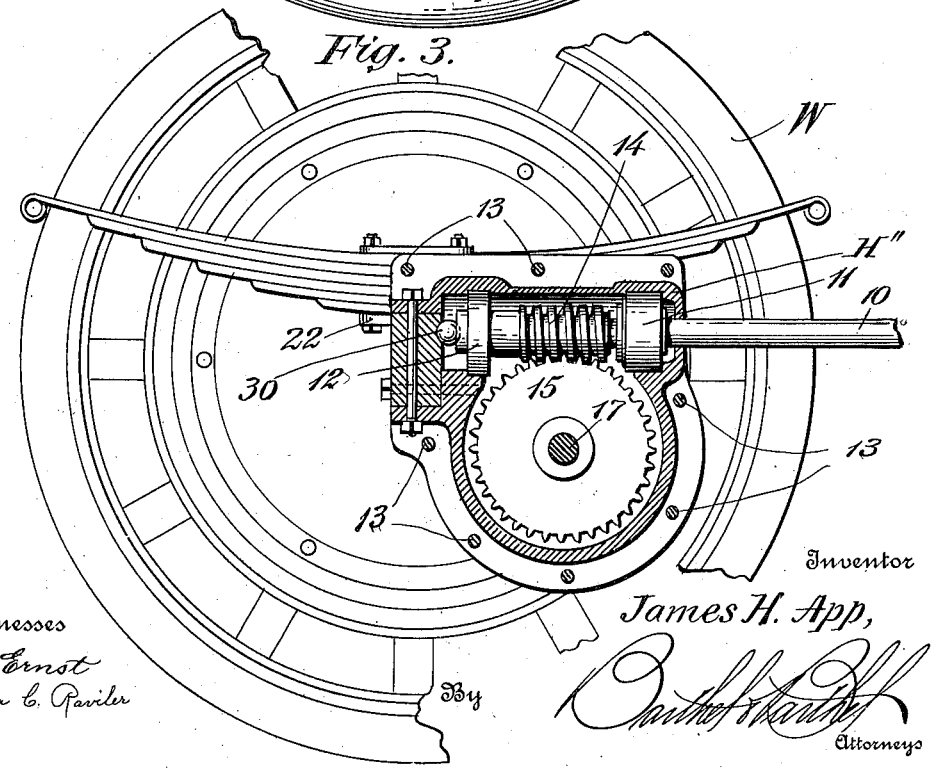

UNITED STATES PATENT OFFICE.

JAMES H. APP, OF DETROIT, MICHIGAN.

DRIVE MECHANISM.

1,029,736. Specification of Letters Patent. Patented June 18, 1912.

Application filed July 5, 1911. Serial No. 636,902.

*To all whom it may concern:*

Be it known that I, JAMES H. APP, a citizen of the United States of America, residing at Detroit, in the county of Wayne and State of Michigan, have invented certain new and useful Improvements in Drive Mechanism, of which the following is a specification, reference being had therein to the accompanying drawings.

This invention relates to driving mechanism of motor vehicles, and it has for one of its objects the provision of such a mechanism in which a worm and gear are employed, in connection with an internal gear transmission between the driven shaft and the vehicle wheels.

The invention has furthermore for its object the improved construction of the support for the engine-driven shaft on the driving axle, such support comprising an improved organization of the casing and the bearings for the various elements contained therein.

Further objects of the invention will hereinafter appear and be particularly defined in the claims.

The invention has been clearly illustrated in the accompanying drawings, in which similar characters denote similar parts, and in which—

Figure 1:
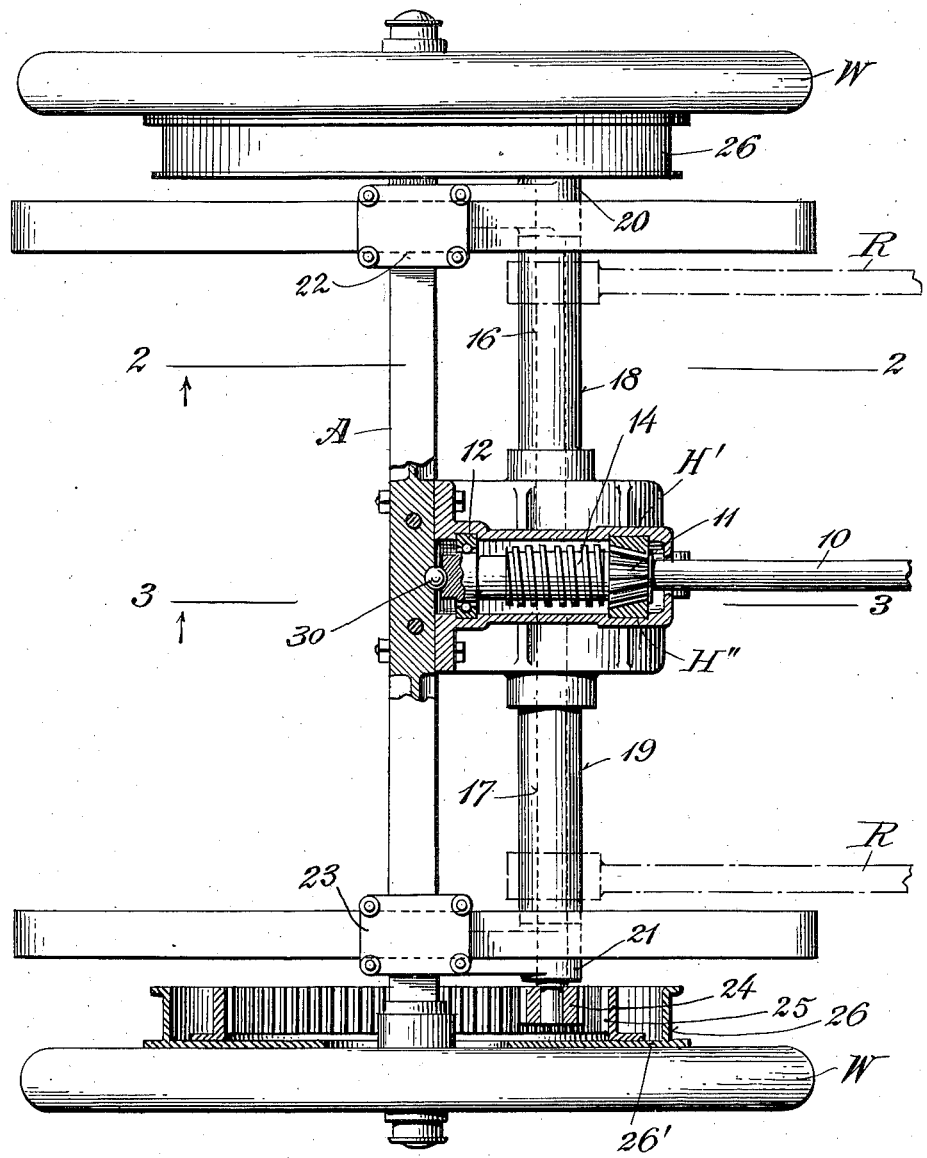
Figure 1:

Figure 1 represents the top view of the driving axle and wheels of an automobile, together with the driving mechanism therefor embodying my invention; Fig. 2 is a vertical section on line 2—2 of Fig. 1; and Fig. 3 is a similar section on line 3—3 of Fig. 1.

Referring to the drawings, 10 denotes the motor-driven shaft of the vehicle. It is journaled in a roller and thrust-bearing 11, and a ball bearing 12, both of which bearings are secured in a housing the parts H' H" of which are held together by bolts 13, and tightly attached to the axle A, which consists preferably of an I-beam and has trunnions at its ends for supporting the wheels W of the vehicle.

The shaft 10 has a worm 14 in engagement with a gear 15 which is connected by a differential mechanism (not shown) in the housing with a pair of shaft-sections 16, 17, extending to opposite sides therefrom, each shaft being journaled in suitable bearings in tubular casings 18, 19, attached to the main housing and also supported at their outer ends in brackets 20, 21 secured to the axle A preferably at a point immediately below the spring perches 22, 23, which constitute a part of said axle. Each shaft 16, 17 carries a pinion 24 in engagement with an internal gear annulus 25 which is detachably secured by bolts 27 to the flange 26' of a brake drum 26, the latter being secured to the vehicle wheel W. If desired, another size gear and pinion may be substituted for those shown to vary the speed ratio of the shafts and wheels in accordance with the requirements and purposes of the vehicle.

In order to insure a free-running condition of the shaft 10 when working under load, I preferably employ a ball 30 between the end of said shaft and the axle, (see Fig. 1), so that the thrust on the shaft will be taken up in a line directed against the axle itself. By this organization, it will be noted, the cross-shafts 16, 17 are disposed in a plane below the horizontal plane of the wheel trunnions, and when "radial" rods R are employed, the structural stiffness of the entire mechanism becomes very much enhanced.

Changes may be made in the organization and also in the particular construction of the elements without departing from the spirit of the invention.

I claim:

1. The combination with a stationary axle, and wheels journaled thereon, of a differential shaft journaled on said axle for driving said wheels, a worm gear on said shaft, a motor shaft in direct thrust-line with the axle, a worm thereon engaging said worm gear, and a thrust member between said motor shaft and front side of the axle.

2. The combination with a stationary axle, and wheels journaled thereon, of brackets carried by the opposite ends of said axle, a housing secured thereto intermediate its ends, tubular connections between the brackets and housing, a differential shaft journaled therein, a motor-shaft in direct thrust-line against the axle, a worm and gear connection between said shafts and disposed in said housing, a thrust bearing between the motor shaft and the axle, and means for connecting said wheels and the differential shaft.

In testimony whereof I affix my signature in presence of two witnesses.

JAMES H. APP.

Witnesses:
　ANNA C. RAVILER,
　F. E. ERNST.